United States Patent [19]

Winkler et al.

[11] Patent Number: 5,302,564

[45] Date of Patent: * Apr. 12, 1994

[54] SINTERED MICROCRYSTALLINE CERAMIC MATERIAL

[75] Inventors: Herwig Winkler; Peter Janz, both of Klagenfurt; Georg Gottschamel, Treibach, all of Austria

[73] Assignee: Treibacher Chemische Werke Aktiengesellschaft, Treibach, Fed. Rep. of Germany

[*] Notice: The portion of the term of this patent subsequent to Oct. 1, 2008 has been disclaimed.

[21] Appl. No.: 839,248

[22] Filed: Feb. 20, 1992

[30] Foreign Application Priority Data

Mar. 11, 1991 [AT] Austria ................................. 520/91

[51] Int. Cl.$^5$ ............................................. C04B 35/50
[52] U.S. Cl. ................................... 501/127; 501/95; 501/117; 501/119; 501/153; 501/132; 51/309; 264/66
[58] Field of Search ................... 501/12, 95, 127, 152, 501/153, 117, 119, 132; 264/60, 65, 66; 51/293, 307, 309; 252/315.01, 315.7

[56] References Cited

U.S. PATENT DOCUMENTS

| 4,252,544 | 2/1981 | Takashashi | 51/309 |
| 4,518,397 | 5/1985 | Leitheiser et al. | 51/293 |
| 4,574,003 | 3/1986 | Geric | 51/309 |
| 4,799,938 | 1/1989 | Janz et al. | 51/293 |
| 4,867,761 | 9/1989 | Brandt et al. | 51/309 |
| 4,959,331 | 9/1990 | Mehrotra et al. | 501/89 |
| 5,053,369 | 10/1991 | Winkler et al. | 501/152 |

FOREIGN PATENT DOCUMENTS 368837 5/1990 European Pat. Off. .
395091 10/1990 European Pat. Off. .

Primary Examiner—Mark L. Bell
Assistant Examiner—Michael Marcheschi
Attorney, Agent, or Firm—Collard & Roe

[57] ABSTRACT

Abrasive material with particularly high abrasive performance is obtained in that the ceramic material contains an additive of 0.01 to 15 percent by weight, preferably 0.1 to 3 percent by weight of a chromium compound.

23 Claims, No Drawings

SINTERED MICROCRYSTALLINE CERAMIC MATERIAL

The present invention relates to a sintered microcrystalline ceramic material on the basis of $\alpha$-$Al_2O_3$ with an addition of 0.01 to 2 weight percent, preferably 0.01 to 0.5 weight percent of a cerium compound and 0.0 to 15 weight percent, preferably 0.1 to 5 weight percent of a chromium compound.

The principal publications on the production of ceramic material made from $\alpha$-$Al_2O_3$ through the sol-gel process have already been disclosed in the European Patent application No. 368 837.

The U.S. Pat. No. 4 744 802 offers the possibility of adding a chromium-containing compound to a sol mixed with nucleating particles of $\alpha$-$Fe_2O_3$. It is known from literature that chromium (III) oxide forms mixed crystals with $\alpha$-$Al_2O_3$ at high temperatures.

The European Patent application EP-A 395 091 discloses the addition of chromium oxide as a nucleating agent as an alternative to $\alpha$-$Al_2O_3$ or $\alpha$-$Fe_2O_3$. The fact that there are differing opinions in literature on the effect of chromium compounds on the transformation of transitional aluminium oxides to $\alpha$-$Al_2O_3$ is presumably a consequence of the redox behaviour of chromium oxide. G. C. Bye discloses in his publication "Influence of Cr and Fe on Formation of $\alpha$-$Al_2O_3$ from $\tau$-$Al_2O_3$" (J.Amer.Cer.Soc.57(1974) p. 367-371) the retarding effect of Cr(VI) on the formation of $\alpha$-$Al_2O_3$ next to the accelerating effect of $Fe_2O_3$. At the same time, however, he points out the possibility that the hexagonal Cr(III) oxide crystals he found between 800 and 900° C. might have a nucleating effect on the formation of the mixed crystal of the grain.

The European Patent application No. 368 837 describes a ceramic material that contains, in addition to $\alpha$-$Al_2O_3$, whisker needle crystals. The needles contain cerium.

It is the object of the present invention to produce ceramic material which can be used, inter alia, as abrasive material and, due to its particular chemical composition and structure, shows exceptionally high tenacity combined at the same time with an even higher hardness.

This object is achieved in that the ceramic material consists of a crystalline matrix with 0.1 to 30 percent by volume, preferably 1 to 25 percent by volume of whisker particles. The particles have a diameter of between 0.2 and 1 $\mu$m, and their length is between 1-20 $\mu$m. The matrix consists of a solid solution of 0.01 to 15 weight percent $Cr_2O_3$ in $\alpha$-$Al_2O_3$. The hardness of this mixed crystal is higher than that of pure $\alpha$-$Al_2O_3$. The matrix has a preferable crystallite size of less than 0.5 $\mu$m and a very even structure.

Examinations carried out with a transmission electron microscope have shown that the incorporated particles may be present either as needle-shaped whiskers or wholly or partially as small plates. It is safe to say that the respective amounts depend on the conditions at the time of the formation.

For simplicity's sake the particles will be referred to hereinunder as whiskers, which also includes single-crystal small plates. The thickness of the small plates is equivalent to the diameter of the whiskers. The dimensions that are vertical thereto are equivalent to the whisker length.

According to TEM examinations, the whiskers consist of a Ce-Al-oxide compound from the $\beta$-corundum type. A part of the Al-ions is replaced by Cr. Furthermore, Ca and other alkaline and alkaline-earth ions are inserted into the crystal lattice in varying amounts. During the formation, Ca and other alkaline ions and alkaline-earth ions are withdrawn from the matrix, which leads to an increase in the hardness, because the amount of grain-boundary impurities decreases, which reduces hardness both as crystalline phase as well as glass phase. The content in Ca, alkalines and alkaline earths can amount up 1 to percent without any loss in hardness. Possibly, a lower Ca-content is even necessary for the formation of whiskers. The Ca-content in the particles is strongly increased with respect to the matrix, so that a considerable cleaning effect occurs in the matrix.

The insertion of Cr into the whiskers' lattice causes an increase in the hardness of the Ce-aluminate; $\beta$-corundum structures have a considerably lower hardness than $\alpha$-$Al_2O_3$.

The hardness of the ceramic moulding or abrasive material, which, for example, can be examined for compressive resistance as is common in abrasive diamond grain, is increased by this measure (see examples). The higher hardness and tenacity of the whiskers by inserting Cr improves the pull-out effect and the fissure deflection mechanisms.

The abrasive performance is presumably also improved by a self-whetting effect. The fissure deflection on the needles may also contribute to the formation of new sharp fractured edges. The size of the parts that are broken off depends primarily on the distance of the needles between each other. Therefore it would be possible to adjust and optimize the abrasion behaviour in certain applications by varying the needle concentration (number/volume unit).

Preferably, in addition to the cerium and chromium additives, nucleating agents are added to the $\alpha$-aluminium oxide hydrate suspension.

Nucleating agents are minute particles that consist of $\alpha$-$Al_2O_3$, diaspore, $AlF_3$, $\alpha$-$Fe_2O_3$, $V_2O_3$, $Co_2O_3$, $Nb_2O_3$, $Ce_2O_3$, $\tau$-$Al_2O_3$, $Ga_2O_3$, $GaOOH$, $FeOOH$, $Ti_2O_3$, $Cr_2O_3$. It is also possible to add soluble or non-soluble precursors, i.e. compounds that transform into the above oxides during the heating of the dried material before the normal nucleating of the $\alpha$-$Al_2O_3$ occurs (i.e. at lower temperatures). It is also possible to use mixtures or combinations of the above oxides or precursors thereof, as well as preformed mixed crystals.

The nucleating agent is added in an amount of 5 percent by weight, referred as the oxide to the final product. It was found out that a material produced in such a manner shows improved qualities. The reason for this is probably due to the increased ratio of the length of the whisker-like needles to their diameter. The diameter of the needles decreases while the length remains the same. At the same time, however, the number of needles per volume unit increases.

Further additions of the nucleating agent over 5 percent by weight did not lead to an improvement in the qualities. The nucleating agent can be added in form of a suspension of very fine particles of the boehmite suspension. Such a nucleating suspension is manufactured from commercially available powder by grinding and sedimentation, or any other method that results in a submicron powder. Naturally, the nucleating agent may also be added in a solid form either before or after the desagglomeration.

The addition of magnesium nitrate or any other Mg-containing compound to the aluminium oxide hydrate suspension is preferable for the formation of the microcrystalline structure.

The invention furthermore relates to a method for manufacturing a ceramic material by mixing a highly disperse $\alpha$-$Al_2O_3$ hydrate into a diluted acid solution, by adding a cerium compound of 0.01 to 2 percent by weight, preferably 0.01 to 0.5 percent by weight, calculated as oxide, referring to the $Al_2O_3$, by adding a chromium compound of 0.01 to 15 percent by weight, preferably 0.1 to 5 percent by weight, referring as oxide to aluminium oxide, and by adding, optionally, Ca and/or Mg compounds with 1 percent by weight as oxide, referring to $Al_2O_3$, by drying, comminuting and sintering. This method is characterized in that the suspension is deaerated and desagglomerated before the drying and that the sintering process is carried out in several stages and, preferably, under the pressure of gas. The sintering process is carried out in such a way that, next to a microcrystalline matrix, needle-shaped crystals are formed.

The chromium or cerium may be added not only in form of inorganic or organic salts, but also in form of any other compound that may be finely distributed or is readily soluble, like oxides or hydroxides, for example. The addition of ready $Cr_2O_3$-$Al_2O_3$ mixed crystal has proved to be preferable. It caused both an increased fineness and homogeneity of the chemical composition of the matrix and the whiskers with increased density (lower porosity) of the material.

The desagglomeration can be carried out in a dispersing device according to the rotor-stator principle. Other dispersing devices such as, for example, ball mills with agitators may also be used. However, the quality of the product is impaired by increased attrition of the grinding body or metal attrition.

Commercially available pseudo-boehmites (Pural, Disperal, Versal) with a purity of more than 99% and a specific surface of between 150 and 190 $m^2g$ can be used as highly disperse $\alpha$-aluminium oxide hydrates. The solids content of the suspension was between 5 and 40 percent by weight, preferably between 15 and 25 percent by weight. Nitric acid, hydrochloric acid, formic acid or acetic acid can be used as peptizing agents.

The drying is carried out in a film dryer comprising a connected belt dryer. It is also possible, however, to use any other drying apparatus, provided it allows the thorough mixing of the product to be dried in the drying phase, so that a segregation is no longer possible. This is required in order to ensure the desired homogenous distribution of the needles in the final product. The pore structure of the dried material that is thus formed seems to promote the formation of the needles, because considerably fewer needles come about if the drying is carried out in a state of rest.

Preferably, the drying is carried out in a belt dryer heated by microwaves. The heating of the product from the inside brings about a very favourable homogeneity of the dried products with respect to the pore structure and the chemical composition. This promotes the formation of whiskers and the sintering activity, which leads to the improvement of the properties of the final product.

The dried material is comminuted and screened. The grains gained in such a manner can either be directly sintered into abrasive grain or, when it is present in a sufficiently fine form, it is pressed into moulded parts with organic binding agents. All commonly known moulding methods can be applied, i.e. female die moulding, extrusion moulding or roll pressing.

The sintering time depends on the temperature and lies between some minutes and several hours per stage. The multi-stage sintering process can principally be carried out in a suitable furnace. However, it has proved to be beneficial if the first stage is carried out in a specially lined furnace due to the formation of acidic flue gases.

A further variation of the method consists of carrying out the sintering under non-oxidizing or reducing conditions, which prevents the intermediate formation of $CrO_3$ at approx. 300° to 500° C. The conditions, however, may not be such that they lead to a reduction of the Cr under the trivalent form.

Sintering carried out in stage three was at a temperature of 1300° C. at a pressure of 1 bar for 1.5 hours.

A further variation of the method consists of soaking the pre-calcined material with solutions or suspensions. This method is known from the European Patent EU 394 213. All the above mentioned additions and precursors of the nucleating agents can be added in such a manner.

The proportion of the cerium compound in the whiskers can be up to 20 percent by weight. Desirably, the proportion of the cerium compound in the whiskers can be up to 10 percent by weight. The $Al_2O_3$-$Cr_2O_3$ mixed crystal can contain up to 99 percent by weight $Cr_2O_3$. In other words, the cerium compound is substantially present in the whiskers. The whiskers are precipitation products of the material itself.

In the method according to the invention, the sintering process is carried out in several stages between 500° C. and 1400° C. For example, the sintering in stages two and four can be carried out at a gas pressure of 1 to 1000 bar, for a period of five minutes up to a maximum of three hours, whereby the temperature is set between 800° C. and 1150° C. in the first stage, and between 1250° C. and 1400° C. in the fourth stage. In addition, the sintering in stages two and four can be carried out at a gas pressure of 50 to 100 bar, for a period of five minutes up to a maximum of three hours, whereby the temperature is set between 800° C. and 1150° C. in the first stage, and between 1250° C. and 1400° C. in the fourth stage. In one embodiment, the drying and sintering process step is carried out by microwaves. In another embodiment, the calcined product is heated up to 1650° C., thereafter rapidly cooled with a cooling speed of at least 100° C./minute, and then finally sintered at 1100° C. to 1400° C.

The material in accordance with the invention is highly suitable for abrasive purposes. Moreover, it can be applied for all known uses of aluminium oxide ceramics. Before using the material in abrasive discs it has proved to be preferable if the material is comminuted before the sintering. For use in belts and flexible discs the comminution after the sintering has proved to be more beneficial.

The invention will now be outlined in greater detail by reference to the examples below:

EXAMPLE 1

(Manufacturing the suspension)

10 kg of α-aluminium oxide hydrate of the brand Disperal (R) were continuously mixed into a solution of 39.5 kg of water and 440 g of concentrated nitric acid. Subsequently, the suspension was deaerated in a laboratory vaccum deaeration system at 100 mbar and then pumped through a dispersing device with two feed openings. The flow speed was 3 l/h and the speed of the rotor was 15000 r.p.m. A solution of 4.5 g/l of cerium (III) nitrate hexahydrate and 14 g/l chromium (III) nitrate nonahydrate was pumped through the second feed opening of the dispersing device at a flow rate of 300 ml per hour.

The desagglomerated suspension was then further processed in accordance with the examples 2–6. The sintered final product contained 0.1 percent by weight $CeO_2$ and 0.3 percent by weight of $Cr_2O_3$.

EXAMPLE 2

The suspension of example 1 was concentrated by evaporation under continuous mixing. After the coagulation in polypropylene cups it was dried for 36 hours at 80° C. in a hot-air dryer resulting in brittle discs. The dried discs were comminuted to grain in a swing-sledge mill and then screened in a screening machine (proportion of fine grain <0.1—see example 5). The grains were then calcined for one hour at 600° C. in a muffle kiln. The material was then heated to 900° C. in a gas pressure sintering furnace. Nitrogen was used as the gas atmosphere. After raising the pressure to approx. 100 bar, the temperature was increased within one hour to 1100° C. The pressure was then reduced to 1 bar and the temperature was further increased to 1300° C. After a further 1.5 h at 1300° C. the material was finally sintered for 15 min at 100 bar. The material had 3 volume percent of porosity and contained approx. 15 volume percent of whiskers with diameters ranging from 0.2 to 0.5 μm and a length of between 3 and 5 μm.

The chemical composition of the matrix and the needles was determined by a transmission electron microscope—energy dispersive analysis (TEM-EDX). Next to $Al_2O_3$ and approx. 0.3 percent $Cr_2O_3$, the matrix in the vicinity of the whiskers did not contain any impurities. The whiskers themselves contained approx. 1 percent by weight CaO, 5 percent by weight $CeO_2$ and approx. 0.5 percent by weight $Cr_2O_3$.

EXAMPLE 3

The suspension of example 1 was dried in the microwave dryer. The dried discs were further processed as shown in example 2. The material contained 2 volume percent porosity and 18 volume percent whiskers.

EXAMPLE 4

The dried material of example 3 was comminuted only very coarsely and then sintered as shown in example 2. The final comminution and the screening took place after the sintering.

EXAMPLE 5

Dried fine grain (<0.1 mm) of example 2 was mixed with 25 percent by weight $H_2O$ and moulded into cylinders (diameter: 30 mm, length: 5 mm). The moulding took place uniaxially in a matrix at 400 MPa. The cylinders were sintered in accordance with example 2. The sintered material showed 2 volume percent porosity and practically had the same microstructure with needles similar to the material of example 2. The sintered cylinder was comminuted to grain and screened.

EXAMPLE 6

The cylinders pressed according to example 3 were comminuted and screened before the sintering. The screened grain was sintered like in example 2.

EXAMPLE 7

The α-aluminium oxide hydrate suspension was manufactured as shown in example 1. The added solution contained 17.9 g/l cerium nitrate hexahydrate, 5.6 g/l magnesium nitrate hexahydrate and 14 g/l chromium nitrate nonahydrate, so that the final product contained 0.4 percent by weight $CeO_2$, 0.3 percent $Cr_2O_3$ and 0.05 percent MgO. The desagglomerated suspension was further processed as shown in example 3. The sintered product contained 2 volume percent pores and 20 volume percent whiskers.

EXAMPLE 8

10 kg Disperal (R) were mixed into a solution of 39.5 kg water, 440 g concentrated nitric acid, 78 g cerium nitrate hexahydrate, 205 g chromium nitrate nonahydrate and 25 g magnesium nitrate hexahydrate and then deaerated (like in example 1). The suspension was desagglomerated in a ball mill with agitator, with the attrition from the grinding bodies (balls with 85 percent aluminium oxide) being less than 0.2 percent by weight referring to the final product. The suspension was further processed as in example 3. The sintered product contained 0.4 percent $CeO_2$, 1 percent $Cr_2O_3$ and 0.05 percent MgO.

The analysis of the matrix in the vicinity of the whiskers, by employing TEM-EDX, showed next to $Al_2O_3$ only approx. 0.9 percent $Cr_2O_3$, but no Ca, Ce, K, Na and Mg. Next to $Al_2O_3$ the whiskers contained approx. 3 percent by weight CaO, 11 percent by weight $CeO_2$ and approx. 1 percent by weight $Cr_2O_3$.

EXAMPLE 9

10 kg Disperal (R) were mixed into a solution of 39.5 kg water, 440 g concentrated nitric acid, 78 g cerium nitrate hexahydrate, 61 g chromium nitrate nonahydrate and 25 g magnesium nitrate hexahydrate. The suspension was deaerated like in example 1 and desagglomerated in the ball mill with agitator. After drying in the microwave dryer, the material was comminuted and screened. The screened grain was precalcined in a muffle kiln for four hours at 800° C. Then it was heated to 1650° C. in a continuous rotating tubular kiln (dwell period in the hot zone approx. 10 min). It was then rapidly cooled and sintered in the muffle kiln for four hours at 1300° C. The sintered material contained 0.4 percent $CeO_2$, 0.3 percent $Cr_2O_3$ and 0.05 percent MgO. The whisker content was approx. 20 volume percent.

Manufacturing the nucleating agent

A suspension consisting of 6.5 kg water and 3.5 kg Bayer alum earth with 105 g concentrated nitric acid was ground in a ball mill with agitator until the median of the grain size distribution was 0.6 μm (determined by a sedigraph). The suspension was diluted (from 35 percent by weight $Al_2O_3$ to 20 percent by weight). All particles >0.2 μm were removed from the suspension by sedimentation. The resultant fine suspension contained 2 percent by weight α-Al$_2$O$_3$ and was used as a nucleating additive.

Alternatively, 4 kg of a pure Cr$_2$O$_3$ pigment was mixed into 6 kg water and 50 g concentrated nitric acid and ground in a ball mill with agitator. Similar to the alum earth, the coarse particles exceeding 0.2 μm were removed from the suspension by sedimentation. The resultant suspension contained approx. 1.5 percent by weight Cr$_2$O$_3$ and was used in example 12 as a nucleating agent.

A suspension of 10 kg Disperal (R) was kneaded with a solution of 500 g concentrated nitric acid and 10 kg chromium nitrate nonahydrate in 39.5 kg water in a laboratory kneading machine until a homogenous mass (gel) came about. The gel was then annealed in a muffle furnace at approx. 1200° C. The annealed material was comminuted and, like the alum earth, processed to a fine suspension, which was used in example 13 as a nucleating agent. The suspension contained approx. 0.5 percent solids. The solids had the crystal structure of the α-Al$_2$O$_3$-Cr$_2$O$_3$ mixed crystal and had a Cr$_2$O$_3$ content of approx. 25 percent by weight.

A further example of a nucleating agent consisted of processing commercially available diaspore, such as the alum earth, to a fine suspension. The suspension had a Al$_2$O$_3$ content of approx. 5 percent by weight and was used in examples 18-21 as a nucleating agent.

EXAMPLE 10

29.5 kg water, 500 g concentrated nitric acid and 10 kg Disperal (R) were mixed into 10 kg of the alum earth nucleating suspension. The suspension was deaerated and desagglomerated as shown in example 1. The added solution contained 17.9 g/l cerium nitrate hexahydrate and 14 g/l chromium nitrate nonahydrate. The desagglomerated suspension was further processed as shown in example 3. The sintered material contained 0.4 percent by weight CeO$_2$ and 0.3 percent by weight Cr$_2$O$_3$. The whiskers content was approx. 30 volume percent. The whiskers had a diameter of approx. 0.2-0.5 μm and lengths of 4-10 μm. The porosity was 1 volume percent.

EXAMPLE 11

The sintered screened material of example 10 was precalcined at 900° C. and sintered for four hours in the muffle kiln at 1300° C. The sintered material contained approx. 25 volume percent whiskers (diameter 0.2-0.5 μm, length 3-8 μm).

EXAMPLE 12

26.5 kg water, 500 g concentrated nitric acid and 10 kg Disperal (R) were mixed into 13 kg of the Cr$_2$O$_3$-containing suspension. The suspension was deaerated and desagglomerated like in example 1. The added solution contained 4.5 g/l cerium nitrate hexahydrate, 14 g/l chromium nitrate nonahydrate and 5.6 g/l magnesium nitrate hexahydrate. The suspension was further processed as shown in example 3. The sintered product contained 0.1 percent by weight CeO$_2$, approx. 3 percent by weight Cr$_2$O$_3$ and 0.05 percent by weight MgO. Next to Al$_2$O$_3$ the whiskers contained approx. 3 percent by weight CaO, 5 percent by weight CeO$_2$ and 2 percent by weight Cr$_2$O$_3$.

EXAMPLE 13

500 g concentrated nitric acid and 10 kg Disperal were mixed into 40 kg of the finely mixed crystal suspension. The suspension was deaerated and desagglomerated as shown in example 1. The added solution contained 4.5 g/l cerium nitrate hexahydrate. The suspension was dried in the microwave dryer, comminuted and screened. The screened grain was precalcined at 900° C. and sintered in the muffle kiln for four hours at 1300° C. The sintered product contained 0.1 percent by weight CeO$_2$ and 0.65 percent by weight Cr$_2$O$_3$.

EXAMPLE 14

10 kg of Disperal (R) were mixed into a solution of 39.5 kg water, 440 g concentrated nitric acid, 196 g cerium nitrate hexahydrate and 20.3 g chromium nitrate nonahydrate. The suspension was desagglomerated in a ball mill with agitator. The desagglomerated suspension was further processed as shown in example 13. The sintered product contained approx. 1 percent CeO$_2$ and 0.1 percent by weight Cr$_2$O$_3$. It contained, next to 20 volume percent whiskers, CeO$_2$-sediments.

EXAMPLE 15 (without Cr)

The suspension was manufactured analogous to example 10. The added solution, however, did not contain any chromium. The further processing followed that of example 10. The sintered product contained approx. 0.4 percent by weight CeO$_2$.

EXAMPLE 16 (without Cr)

The material was manufactured analogous to example 15. The comminution and screening, however, took place after the sintering.

EXAMPLE 17

34.5 kg water, 500 g concentrated nitric acid and 10 kg Disperal were mixed into 5 kg of the alum earth nucleating suspension. The suspension was deaerated and desagglomerated as shown in example 1. The added solution contained 17.9 g/l cerium nitrate hexahydrate, 245 g/l chromium nitrate nonahydrate and 5.6 g/l magnesium nitrate hexahydrate. The desagglomerated suspension was further processed as shown in example 13. The sintered product contained 0.4 percent by weight CeO$_2$ and 5 percent by weight Cr$_2$O$_3$.

EXAMPLE 18

35.4 kg water, 500 g concentrated nitric acid and 10 kg Disperal were mixed into 4 kg of the diaspore-contained containing nucleating suspension. The suspension was deaerated and desagglomerated as shown in example 1. The added solution contained 17.9 g/l cerium nitrate hexahydrate, 14 g/l chromium nitrate nonahydrate and 5.6 g/l magnesium nitrate hexahydrate. The desagglomerated suspension was further processed analogous to example 17.

EXAMPLE 19

The suspension was manufactured, deaerated and desagglomerated analogous to example 18. The added solution contained 0.9 g/l cerium nitrate hexahydrate and 52 g/l calcium nitrate. The further processing took place analogous to example 3. The sintered material contained 0.02 percent CeO$_2$ and percent CaO. The whiskers contained approx. 2 percent CeO$_2$ and 10 percent CaO.

EXAMPLE 20

The manufacturing took place analogous to example 19. The added solution contained, however, 17.9 g/l cerium nitrate hexahydrate, 47 g/l chromium nitrate nonahydrate and 52 g calcium nitrate. The sintered material contained 0.4 percent CeO$_2$, 1 percent Cr$_2$O$_3$ and 1 percent CaO. The whiskers contained approx. 7 percent CeO$_2$, 10 percent CaO and 2 percent Cr$_2$O$_3$.

EXAMPLE 21

The manufacturing took place analogous to example 19. The comminution and the screening, however, were carried out after the screening.

EXAMPLE 22

The dried material that was manufactured according to example 15 was comminuted, screened and annealed in a muffle furnace for four hours at 1200° C. The cooled grain was evacuated and covered with a solution of 100 g/l chromium nitrate nonahydrate. After having been aired, the grain was filtered off from the residual solution and then dried. The sintering was carried out according to example 20. The sintered material contained 0.4 percent CeO$_2$ and 0.4 percent Cr$_2$O$_3$.

EXAMPLE 23

The dried material that was manufactured according to example 15 was comminuted, screened and annealed in a muffle furnace for eight hours at 1000° C. The cooled material was evacuated and covered with the desagglomerated suspension from example 17. After having been aired, the grain was separated from the suspension and dried. The grain was sintered in the muffle furnace for four hours at 1300° C. The sintered material contained approx. 1 percent Cr$_2$O$_3$ and 0.4 percent CeO$_2$.

EXAMPLE 24

Analogous to example 10. The comminution, however, was carried out after the sintering.

EXAMPLE 25

The dried sintered material of example 7 was annealed in the rotating tubular kiln at 1600° C. (dwell period approx. 15 min). The material was then rapidly cooled and subjected to final sintering in the muffle furnace for four hours at 1250° C.

EXAMPLE 26

The dried, screened material of example 7 was precalcined for four hours at 800° C. and then sintered in the muffle furnace for four hours at 1300° C. During the sintering a mixture of 90 volume percent nitrogen and 10 volume percent hydrogen flowed through the furnace.

The materials described in the examples were examined with respect to their porosity, whisker content and compressive strength. The porosity was tested with the mercury pycnometer.

The compressive strength of the abrasive grain was tested as follows: the grains were screened to the fraction 0.5 to 0.6 mm. The longitudinal grains were removed from the screened fraction by means of a reciprocating screen. The remainder (cubic grain form) was crushed in a diamond crushing tool specially provided for this purpose. Each grain was crushed per se and the amount of force required for the crushing was measured. The table contains the median values of the distribution of measured forces.

Pictures of metallographic sections were made with the surface electron microscope. The whisker content and their dimensions were measured in these pictures. A median value of 20 grains was established. The whisker content is subject to fluctuations due to the separation during the drying. The majority of the grains, however, contains the amount of whiskers as shown in the table.

The materials produced according to the methods outlined in the examples were used to manufacture abrasive discs, fibre discs and abrasive belts. The abrasive tests shown below are only examples to prove the superior abrasive performance. Naturally, the material in accordance with the invention can also be applied successfully for a large number of other purposes.

Ceramically bound abrasive discs with the material according to the invention were used for the dry grinding of tools. The work piece consisted of steel with a Rockwell hardness HRC 65.

The feed was kept constant and the reciprocal value of the power requirement was used as the quality measure. This value, referring to the reference material without the addition of Cr (example 15), is shown in percent.

Furthermore, the materials of examples 4, 5, 16 and 21 were used to manufacture fibre discs (diameter: 178 mm). They were then used for surface grinding standard steel. The overall abrasion amounts in g after 90 grinding cycles was used as the quality measure. The work piece had a diameter of 25 mm. A commercially available sol-gel corundum and a semiprecious corundum were used as reference material.

The obtained values are listed in the table and clearly show the outstanding abrasive performance of the materials manufactured according to the invention.

TABLE

Qualities and abrasive tests with abrasive discs

| Example No. | Content in CeO$_2$ (weight %) | Content in Cr$_2$O$_3$ (weight %) | Whisker Porosity (Vol. %) | Compr. content (Vol %) | Abrasive strength (N) | perform. (%) |
|---|---|---|---|---|---|---|
| 2 | 0.1 | 0.3 | 3 | 15 | 69 | 120 |
| 3 | 0.1 | 0.3 | 2 | 18 | 72 | 130 |
| 6 | 0.1 | 0.3 | 2 | 17 | 74 | 135 |
| 7 | 0.4 | 0.3 | 2 | 20 | 70 | 130 |
| 8 | 0.4 | 1.0 | 1 | 22 | 78 | 135 |
| 9 | 0.4 | 0.3 | 2 | 20 | 77 | 135 |
| 10 | 0.4 | 0.3 | 1 | 30 | 80 | 140 |
| 11 | 0.4 | 0.3 | 2 | 25 | 69 | 130 |
| 12 | 0.1 | 3 | 1 | 20 | 75 | 135 |
| 13 | 0.1 | 0.65 | 2 | 18 | 65 | 115 |
| 14 | 1 | 0.1 | 2 | 20 | 60 | 105 |
| 15 | 0.4 | — | 1 | 30 | 60 | 100 |
| 17 | 0.4 | 5 | 1 | 28 | 80 | 135 |
| 18 | 0.4 | 0.3 | 2 | 25 | 78 | 140 |
| 19 | 0.02 | — | 1 | 5 | 55 | 95 |
| 20 | 0.4 | 1.0 | 1 | 30 | 81 | 140 |
| 22 | 0.4 | 0.4 | 2 | 30 | 81 | 138 |
| 23 | 0.4 | 1.0 | 2 | 30 | 79 | 142 |
| 25 | 0.4 | 0.3 | 1 | 25 | 78 | 140 |
| 26 | 0.4 | 0.3 | 1 | 23 | 79 | 140 |

TABLE

Properties and abrasive tests with fibre discs

| | | | | | | |
|---|---|---|---|---|---|---|
| 4 | 0.1 | 0.3 | 2 | 18 | 79 | 250 (g) |
| 5 | 0.1 | 0.3 | 2 | 17 | 81 | 260 (g) |
| 16 | 0.4 | — | 1 | 30 | 60 | 200 (g) |
| 21 | 0.4 | 1.0 | 2 | 30 | 79 | 280 (g) |
| 24 | 0.4 | 0.3 | 1 | 30 | 79 | 270 (g) |
| Commercially available sol-gel corundum | | | | | 50 | 160 (g) |
| Semiprecious corundum | | | | | 40 | 130 (g) |

We claim:

1. Sintered microcrystalline ceramic material based on α-Al$_2$O$_3$, consisting of a microcrystalline matrix and 0.1–30 volume percent needle whiskers or small plates embedded in the matrix,
   the ceramic material contains an additive of 0.01 to 2 percent by weight of a cerium compound, which compound is present in the whiskers, and
   the ceramic material contains an additive of 0.3 to 15 percent by weight of a chromium compound, and said whiskers consisting essentially of a mixture of ceria and alumina.

2. Sintered microcrystalline ceramic material based on α-Al$_2$O$_3$, consisting of a microcrystalline matrix and 1–15 volume percent needle whiskers or small plates embedded in the matrix,
   the ceramic material contains an additive of 0.01 to 0.5 percent by weight of a cerium compound, which compound is present in the whiskers, and
   the ceramic material contains an additive of 0.3 to 3 percent by weight of a chromium compound, and said whiskers consisting essentially of a mixture of ceria and alumina.

3. Ceramic material in accordance with claim 1, wherein the needle whiskers also contain an element selected from the group consisting of calcium and magnesium.

4. Ceramic material in accordance with claim 2, wherein the needle whiskers also contain an element selected from the group consisting of calcium and magnesium.

5. Ceramic material in accordance with claim 1, wherein the cerium compound is an oxide.

6. Ceramic material in accordance with claim 1, wherein the chromium compound is an oxide.

7. Ceramic material in accordance with claim 1, wherein the matrix crystallite size is less than 1 μm.

8. Ceramic material in accordance with claim 1, wherein the matrix crystallite size is less than 0.5 μm.

9. Method for manufacturing a ceramic material comprising
   mixing a highly disperse α-aluminum oxide hydrate into a diluted acid solution to produce a suspension,
   adding to the suspension a cerium compound of 0.01–2 percent by weight calculated as CeO$_2$ based on the aluminum oxide content,
   adding a chromium compound of 0.3 to 15 percent by weight, based on the Al$_2$O$_3$, to the suspension,
   deaeration, desagglomeration, drying and comminution, and
   carrying out a multi-stage sintering process partly taking place under gas pressure.

10. Method for manufacturing a ceramic material comprising mixing a highly disperse α-aluminum oxide hydrate into a diluted acid solution to produce a suspension,
    adding to the suspension a cerium compound of 0.01–0.5 percent by weight calculated as CeO$_2$ based on the aluminum oxide content,
    adding a chromium compound of 0.3 to 3 percent by weight, based on the Al$_2$O$_3$, to the suspension,
    deaeration, desagglomeration, drying and comminution, and
    carrying out a multi-stage sintering process partly taking place under gas pressure.

11. Method in accordance with claim 9, comprising adding up to 5 percent by weight, based on the Al$_2$O$_3$, of ultra-fine particles of a nucleating agent or a precursor thereof to the α-aluminum oxide hydrate suspension in addition to the cerium additive.

12. Method in accordance with claim 10, comprising adding up to 2 percent by weight, based on the Al$_2$O$_3$, of ultra-fine particles of a nucleating agent or a precursor thereof to the α-aluminum oxide hydrate suspension in addition to the cerium additive.

13. Method in accordance with claim 13, wherein an Al$_2$O$_3$-Cr$_2$O$_3$ mixed crystal is used as nucleating agent.

14. Method in accordance with claim 13, wherein the Al$_2$O$_3$-Cr$_2$O$_3$ mixed crystal contains up to 99 percent by weight Cr$_2$O$_3$.

15. Method in accordance with claim 9, wherein the added chromium compound is up to 100% comprised of Al$_2$O$_3$-Cr$_2$O$_3$ mixed crystals.

16. Method in accordance with claim 9, comprising carrying out the sintering process in several stages between 500° C. and 1400° C.

17. Method in accordance with claim 9, comprising carrying out the sintering in stages two and four at a gas pressure of 1 to 1000 bar, for a period of five minutes up to a maximum of three hours,
    setting the temperature between 800° C. and 1150° C. in the first stage and between 1250° C. and 1400° C. in the fourth stage, and
    carrying out the sintering in stage three at a temperature of 1300° C. at a pressure of 1 bar for 1.5 hours.

18. Method in accordance with claim 9, comprising carrying out the sintering in stages two and four at a gas pressure of 50 to 100 bar, for a period of five minutes up to a maximum of three hours,
    setting the temperature between 800° C. and 1150° C. in the first stage and between 1250° C. and 1400° C. in the fourth stage, and
    carrying out the sintering in stage three at a temperature of 1300° C. at a pressure of 1 bar for 1.5 hours.

19. Method in accordance with claim 9, comprising carrying out the drying and sintering process by microwave.

20. Method in accordance with claim 9, comprising heating the calcined product up to 1650° C.,
    thereafter rapidly cooling with a cooling speed of at least 100° C./min, and then
    finally sintering at 1100° to 1400° C.

21. Method in accordance with claim 9, comprising carrying out the sintering in a non-oxidizing or reducing atmosphere.

22. Method in accordance with claim 9, wherein the solids content of the suspension lies between five and 40 percent by weight.

23. Method in accordance with claim 9, wherein the solids content of the suspension lies between 15 and 25 percent by weight.

* * * * *